METHOD AND APPARATUS FOR EDITING TELEVISION TAPE

Filed July 28, 1958 2 Sheets-Sheet 1

INVENTOR.
OTTO R. NEMETH
BY
Elliott & Pastoriza
ATTORNEYS

INVENTOR.
OTTO R. NEMETH
BY
Elliott & Pastoriza
ATTORNEYS

United States Patent Office 3,030,441
Patented Apr. 17, 1962

3,030,441
METHOD AND APPARATUS FOR EDITING TELEVISION TAPE

Otto R. Nemeth, 537 San Vicente Blvd., Santa Monica, Calif.
Filed July 28, 1958, Ser. No. 751,320
10 Claims. (Cl. 178—6.6)

This invention relates generally to editing, and more particularly to a novel method and apparatus for editing magnetic tape used for recording television programs.

One of the primary advantages of recording television programs on magnetic tape resides in the ability to play back or reproduce the television program immediately after it has been recorded. However, in order that a satisfactory picture can be recorded and reproduced from the magnetic tape, it is necessary that the tape travel at a relatively high and constant speed through the recording head in order to accommodate within the physical structure of the tape itself the relatively wide band of frequencies characterizing the signals from the television camera. As a consequence, many hundreds and even thousands of feet of magnetic tape may be required for a single program recording. This great length of tape coupled with the fact that the scenes recorded on the tape are not visible except through reproduction on a monitoring screen from a play-back head renders the editing of television programs recorded on tape extremely difficult.

With the foregoing in mind, it is a primary object of the present invention to provide a novel method and apparatus for editing a television tape upon which a television program has been recorded to the end that the editing process can be accomplished with greater accuracy and in a fraction of the time presently required.

More particularly, it is an object to provide an improved editing system in which parts of the editing process may be accomplished as the program is being recorded with a consequent saving of time and labor in the provision of a completely edited tape.

Other objects of the invention are to provide a novel tape editing system in which the actual editing of the tape itself may be carried out with a minimum of cutting and splicing of the magnetic tape and a minimum of rewinding and searching for particular scenes.

Briefly, these and many other objects and advantages of this invention are achieved in a first embodiment of the invention by the following method steps: first, the magnetic tape upon which the television program is to be recorded is provided with tape markings at given intervals prior to the actual recording step. These tape markings are both visible and reproducible by a play-back head and preferably are disposed along one longitudinal margin of the tape; second, the television program is photographed on motion picture film as it is being recorded on the marked tape; and, third, the motion picture film is marked with film markings corresponding to the tape markings at given intervals during the photographing of the program such that scenes on the tape with respect to the tape markings correspond in position to scenes on the film with respect to the corresponding film markings.

The motion picture film is developed and dried prior to winding on the take-up reel of the motion picture camera by an automatic development process so that the film itself is immediately available for editing with conventional motion picture editing equipment. The edited motion picture film may then be employed to edit the magnetic tape by a simple comparison of the various markings along the longitudinal edge of the tape and the film. Since the tape markings are visible, the editing of the tape is enormously simplified. Moreover, since the complete editing job insofar as providing a desired program is concerned is accomplished on the film, the tape can be successively edited in accordance with the film by only a single winding through of the tape.

The principal time saving factor in the foregoing method is a consequence of the relatively short length of motion picture film that must be edited as compared to the length of magnetic tape required for recording a corresponding program. For example, a four hundred foot reel of 16 mm. motion picture film can accommodate approximately a fifteen minute program, whereas more than one thousand feet of magnetic tape is required to record the same fifteen minute program.

A preferred apparatus for carrying out the foregoing method comprises a tape recording machine provided with a play-back head positioned to receive tape directly from the recording head. The play-back head is connected to a monitoring television receiver screen so that the program is reproduced on the monitoring screen substantially simultaneously as it is being recorded. Further, the various tape markings on the magnetic tape are also reproduced on the screen. A motion picture camera is positioned to photograph the program from the monitoring screen. The camera will also simultaneously photograph the tape markings reproduced so that there will be provided film markings corresponding to the tape markings directly on the film.

After exposure, the film may be fed through a continuous developing process housed within the camera itself to a take-up reel. Alternatively, the film could be fed directly into an editing machine and portions of the editing carried on covering the first portions of the program while the latter portions of the program are being recorded and photographed. The editing film, as described in the method, is then employed to effect editing of the magnetic tape.

In accordance with a second embodiment of the invention, a signal pre-recorded on the tape may be employed to drive the developed film at a given speed ratio to that of the tape through the film editing machine as the tape is being driven through the tape editing machine. By this arrangement, the tape may be edited simultaneously with the film since the position of the tape scenes in the tape editing machine will always correspond to the film scenes as viewed in the film editing machine. If the editing is done simultaneously in this manner, the code markings on the tape and film would be unnecessary except for an initial marking to enable the tape and film to be properly synchronized when starting through their respective editing machines.

A better understanding of the invention and its various features and advantages will be had by referring to the accompanying schematic drawings in which.

Figure 1:
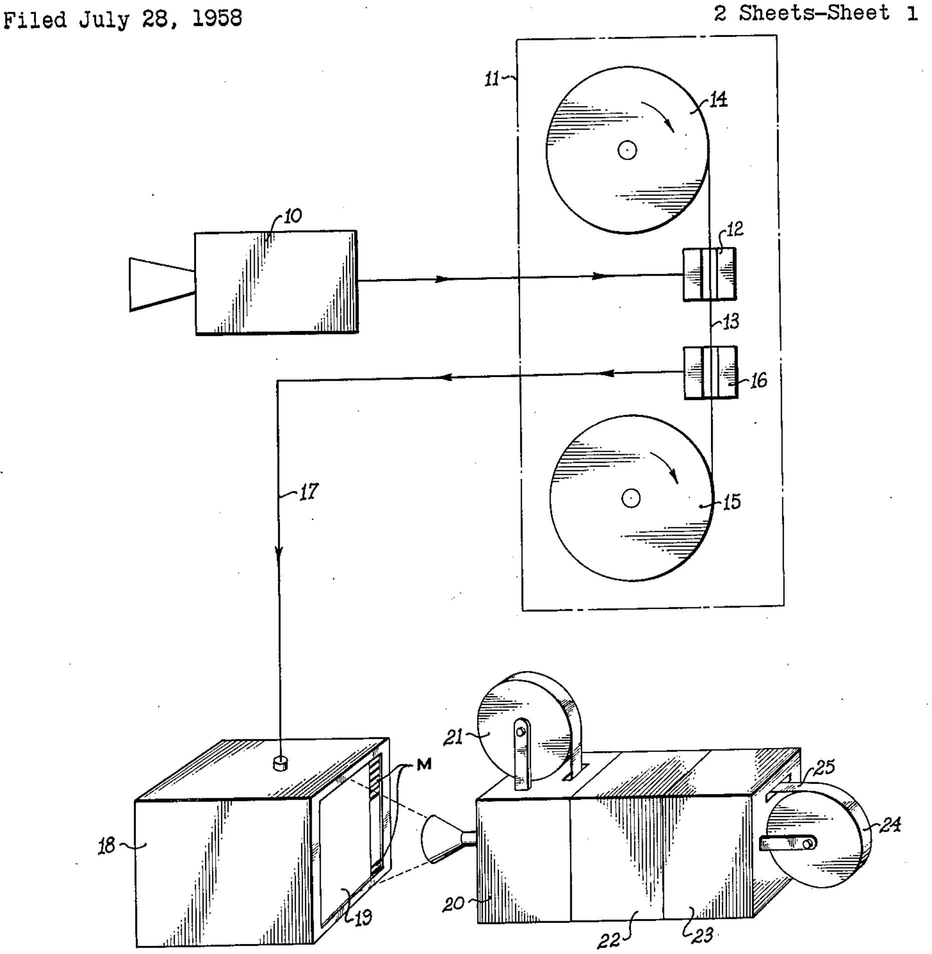
FIGURE 1 is a diagrammatic illustration of the tape editing system in accordance with one embodiment of the present invention.

Referring first to FIGURE 1, there is indicated schematically a television camera 10 for televising a program to be recorded. As shown, the output from the television camera 10 in the form of electrical signals is fed into a tape recording machine 11. The machine 11 includes a recording head 12 for recording the television program on a magnetic tape 13 passed at relatively high speed from a pay-out spool 14 to a take-up spool 15. In the embodiment of the apparatus shown, a sufficient space is provided between the pay-out and take-up spools to accommodate a play-back head indicated at 16 positioned to receive tape directly from the recording head 12.

Signals detected in the play-back head 16 are passed through a suitable video transmission line 17 to a monitoring television receiver 18. The detected signals are reproduced on the screen 19 of the receiver 18.

In accordance with one feature of the invention, the magnetic tape 13 is initially provided with tape markings along its longitudinal edge at spaced intervals preferably in the form of a number code. These markings or code are both visible to the naked eye and reproducible by a play-back head so that the same will appear on the television screen 19 as indicated at M.

A motion picture camera 20 is positioned to photograph the program as reproduced on the television screen 19. As shown, the camera 20 includes a supply reel 21 for passing film down through the camera. After exposure, the film is passed through a continuous processing tank indicated schematically at 22 and thence through a drier 23 to take-up reel 24. The completely processed film is indicated at 25.

It will be evident from the foregoing brief description, that the various scenes photographed on the film 25 in the camera 20 will be adjacent film markings corresponding to the markings M on the television screen 19. The original tape markings from which the markings M are reproduced in turn will be adjacent the identical scenes recorded on the magnetic tape 13. Since the tape markings are visible as well as reproducible by a play-back head, the processed film 25 may be visually compared directly with the tape 13 so that corresponding scenes in the tap can be located visually without the necessity of passing the tape through a play-back head. In order, however, to be able to identify different portions of the tape and film from other portions of the tape or film, the various tape and film markings may be in the form of a code; that is, a sequential symbolic representation which will distinguish any one portion of the tape or film from any other portion.

Figure 2:
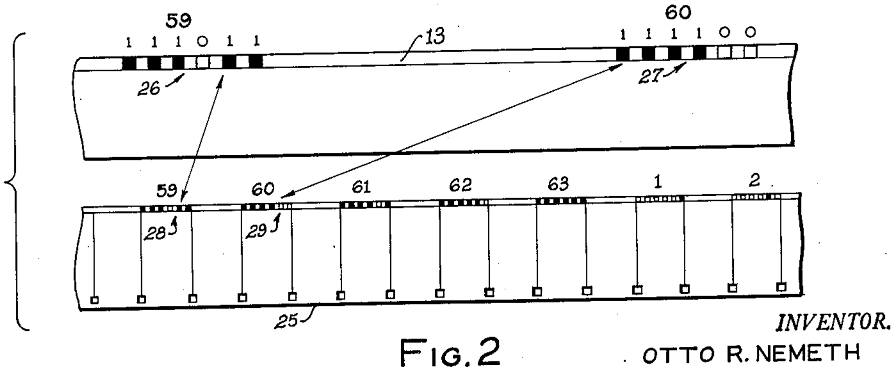
FIGURE 2 illustrates portions of a magnetic tape and a motion picture film in side by side relationship useful in explaining the operation of the system in FIGURE 1.

One such usable code is illustrated in FIGURE 2 wherein the tape 13 is shown with code markings designated generally by the numerals 26 and 27 and the corresponding markings as reproduced on the film 25 are shown generally by the numerals 28 and 29. As a specific example, the tape markings initially provided on the tape prior to recording of the television program may constitute a binary code representing a numerical sequence at spaced intervals along the longitudinal edge of the tape. Thus, in the portion of the tape 13 reproduced in FIGURE 2, there are illustrated two succeeding binary codes representing the numbers 59 and 60; the code may be rendered reproducible from the tape by the presence or absence of a magnetic particle so that the particular binary code can be reproduced in a play-back head. The same code may be rendered visible by simply marking with a visible chemical dye. Thus, as shown in FIGURE 2, the number 59 is shown as constituting three successive filled in portions, a blank portion and two filled in portions representing the binary digit 111011. The next successive binary number shown at 27 in turn is represented by a succession of four filled in marks followed by two blanks thus indicating the binary number 111100 corresponding to 60. Similarly, the next binary code that would appear on the tape would be representative of the number 61 and so forth on up to 63 and then the process would start over with the binary representation of the numeral 1. In the particular example chosen for illustrative purposes, the code, therefore, repeats itself after 64 numerals have been represented. In actual practice, a length of tape corresponding to a time interval of perhaps fifteen minutes to a half hour would be coded numerically before the particular code was repeated in order to avoid any ambiguity in the subsequent editing of scenes.

Referring now to the film 25 in FIGURE 2, it will be noted that the various binary markings have been reproduced on the film wherein there are also shown the markings corresponding to the numerals 61, 62, 63 and 1 and 2. Since the film travels at a much slower speed than the tape, the various code markings will be much closer together as reproduced on the film than as initially appear on the tape. However, the various scenes recorded on the tape with respect to the tape markings will correspond exactly in position to these same scenes as photographed on the film with respect to the corresponding film markings. Thus, the scene recorded on the tape 13 adjacent the code marking 26 will correspond to the scene in the frame of the film 25 adjacent the code marking 28. Similarly, the scene on the film adjacent the code marking 27 will be identical to the scene on the frame adjacent the code marking 29 on the film as indicated by the two headed arrows.

In the actual editing process, the developed film 25 is taken from the reel 24 of the camera of FIGURE 1 and edited in a conventional manner. The completely edited film may then be compared with the tape 13 and the points at which scenes were eliminated from the film can be instantly founded by locating the corresponding coded numbers on the tape. More specifically, if the edited film shows an hiatus of numers, for example, the numbers 61, 62, and 63, it will be evident that the scenes adjacent these numbers have been removed or edited out of the film. Thus, the corresponding coded numbers on the tape 61, 62, and 63 may be cut from the tape and the tape spliced together. Since, as mentioned heretofore, the coded marks are visible to the naked eye on the tape, the entire tape may be edited without having to play back or reproduce any of the scenes from the tape. Moreover, because it is much simpler to edit a motion picture film, not only because of the short length of film as compared to the length of a recording tape, but also because the scenes as indicated in the various film frames are visible and may be precisely located, it will be evident that the subsequent editing of the tape by a comparison with the film will result in greater accuracy in the tape editing process and will also avoid the necessity of searching for the beginning or end of a certain scene on the tape to be edited.

While the monitoring television receiver 18 has been indicated as connected to a play-back head to pick up the program directly from the tape 13, it is, of course, possible to have this monitor television receiver connected directly to the output of the television camera 10 and a small play-back head designed solely to pick up the coded tape markings connected to the receiver to provide the markings M on the television screen. It is also possible to employ a simple exposure system directly in the camera 20 for exposing a marginal edge of the film as it photographs the scene on the screen 19 with the markings passed directly from a play-back head in the tape recording apparatus 11 connected into the camera. In the event a system of the latter type is employed, the camera could, if desired, photograph the program directly and the monitoring television screen portion could be eliminated.

Figure 3:
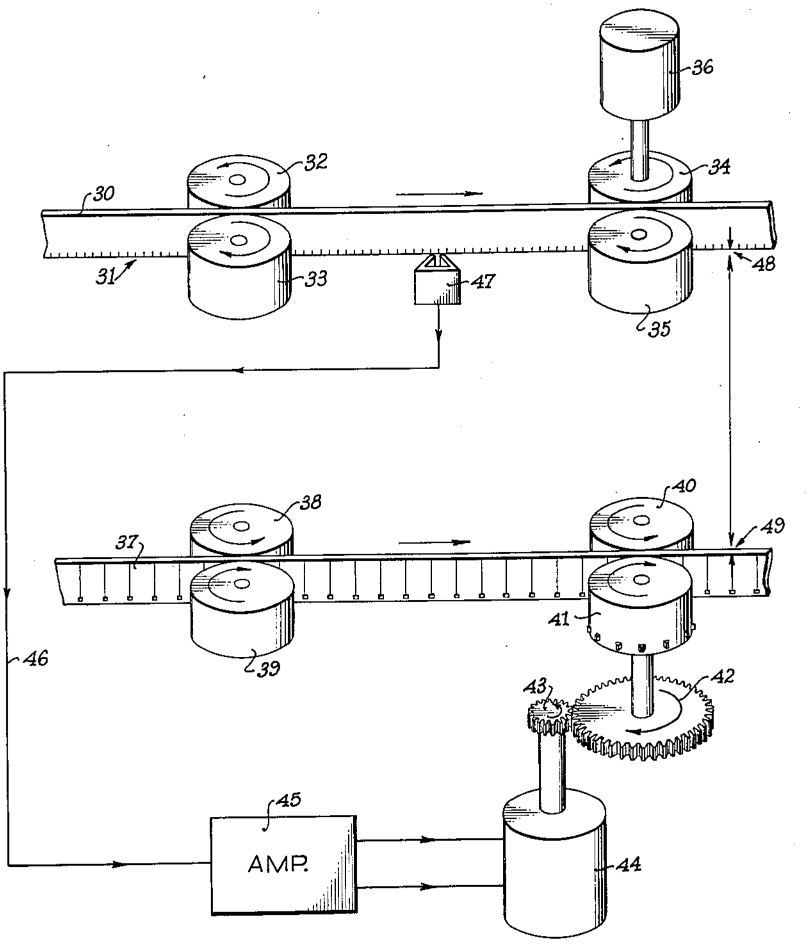
FIGURE 3 illustrates a second embodiment of the invention.

Referring now to FIGURE 3, there is illustrated schematically a second embodiment of the invention. In this embodiment, a tape 30 has recorded thereon a signal of given frequency, for example, sixty cycles per second, along a marginal edge as indicated at 31. The tape after exposure in the recording machine 11 of FIGURE 1 is arranged to be fed through a tape editing apparatus including a pair of guide rollers 32 and 33 and a pair of driving rollers 34 and 35. The driving rollers are driven by a motor 36 which is under manual control of the operator.

Co-operating with the above described structure is a film editing apparatus for editing a movie film 37 taken of the television program. As shown, this apparatus includes a pair of guide rollers 38 and 39 and a pair of driving rollers 40 and 41. The driving roller 41 includes suitable sprocket teeth as shown and is driven through a drive gear 42 meshing with a smaller gear 43 in turn controlled by a stepper motor 44. The stepper motor 44 in turn is under control of an amplifier 45 connected through line 46 to a signal pick-up head 47 adjacent the marginal edge of the tape 30.

By the above described arrangement, it is possible to detect the sixty-cycle signal 31 in the pick-up head 47 and pass this signal through the amplifier 45 to control the speed of the motor 44 in synchronism with the frequency of the control signal. The movement of the film 37 will in turn be effected through the medium of the reduction gears 43 and 42. The ratio of reduction of the gears 43 and 42 is such that the scene on the film 37 passing between the guide and drive rollers will correspond to scenes on the tape 30 adjacent the pick-up head 47. It will be evident, therefore, that if a program is recorded on a thousand feet of magnetic tape in the embodiment of FIGURE 1, and the corresponding motion picture film photographs the scene with only one hundred feet of film, then the tape 30 of FIGURE 3 will be driven ten times as fast as the film 37 so that the beginning, middle, and end scenes will coincide exactly.

Essentially, the embodiment of FIGURE 3 facilitates editing of the tape from the film. For example, when the developed film from the camera of FIGURE 1 is ready for editing, the tape upon which the program has been recorded may be edited simultaneously with the film. For this purpose, the tape may be provided with a single code or die mark 48 marking the beginning of the recording. Similarly, this die mark may be reproduced on the film as at 49 in the same manner as the various film markings were reproduced as described in connection with FIGURES 1 and 2. The operator then lines up the marks 48 and 49 physically in the respective tape and film editing machines illustrated in FIGURE 3. By then manually controlling the rate of rotation of the motor 36, the tape 30 may be driven through the editing apparatus and this action will result in a signal in the pick-up head 47 to cause the film 37 to be driven at a constant fraction of the speed of the tape. The operator will then view the film through a conventional viewer (not shown) as it is being driven through the editing machine and the editing process can begin.

At any point in the film where a particular scene is to be cut, the film is stopped by stopping the tape and because of the synchronism maintained between the tape and the film, the tape will be stopped at a corresponding scene. Thus, both the film and tape may be cut simultaneously. The scene to be removed may then be viewed until the end of the scene is reached at which time the film is again cut and the tape, which will be positioned at the end of the scene as recorded on the tape, may also be cut. Both the tape and film may then be spliced.

It will be evident from the foregoing that when the apparatus of FIGURE 3 is used, it is not necessary that the marginal edge of the tape be provided with a visible code as in FIGURE 2 inasmuch as the synchronous drive connection between movement of the tape and film will automatically bring corresponding portions of the tape into the proper position as the film is being edited. However, it is necessary in the embodiment of FIGURE 3 that the sixty-cycle signal be recorded on the tape. Such a sixty-cycle is conventionally recorded on many tapes normally in order to regulate playback speed and thus when such tapes are used, the only necessary additional markings are the start points as indicated at 48 and 49 on the tape and film, respectively.

It will be evident accordingly that the present invention not only facilitates the editing of tape recorded television programs, but enables such editing to be carried out with increased accuracy and in a fraction of the time heretofore required.

Various modifications and changes that clearly fall within the scope and spirit of the present invention will readily occur to those skilled in the art. The method and apparatus for editing television tape is, therefore, not to be thought of as limited to the specific examples set forth for illustrative purposes.

What is claimed is:

1. A method of editing a television tape upon which a television program is recorded, comprising the steps of: photographing said television program on motion picture film; developing said film; providing an initial tape marking on said tape designating a beginning tape scene; providing an initial film marking on said film designating a beginning film scene corresponding to said tape scene; positioning said exposed tape and developed film in tape and film editing machines, respectively, with said tape marking and film marking in corresponding aligned positions; driving said tape through said tape editing machine; driving said film through said film editing machine at a speed which is a constant fraction of the speed of said tape determined by the ratio of the total length of said film to the total length of said tape, whereby scenes on portions of said tape in said tape editing machine correspond to scenes on said film as viewed in said film editing machine; and simultaneously editing both said film and tape.

2. An apparatus for recording and editing a television program comprising, in combination: a magnetic tape recording machine including a tape upon which said television program is recorded, said tape having visually detectable signals thereon corresponding in physical position on said tape to scenes recorded on said tape; a motion picture camera positioned to photograph said television program while it is being recorded on said tape to provide a motion picture film of said program; and means determined by said detectable signals on said tape for providing markings on said film adjacent to scenes corresponding to said scenes recorded on said tape whereby scenes on said film may be edited by locating said scenes from said markings and said tape may be edited in accordance with the editing of said film.

3. A method of editing television tape comprising the steps of: visibly marking said tape to provide tape markings at given intervals prior to recording a television program thereon; photographing said television program on motion picture film as it is being recorded on said tape; and marking said film with film markings corresponding to said tape markings at given intervals during the photographing of said program such that scenes on said tape with respect to said tape markings correspond in position to scenes on said film with respect to the corresponding film markings, whereby said film may be edited and said tape subsequently edited from said film by comparison of said tape markings with said film markings.

4. A method of editing a tape used for recording a television program comprising the steps of: initially providing tape having tape markings which are both visible and reproducible by a play-back head; recording said program on said tape; photographing said program on motion picture film while said program is being recorded; simultaneously marking said film with visible film markings corresponding to said tape markings such that scenes on said tape adjacent certain tape markings correspond to pictures of said scenes on said film adjacent corresponding film markings; developing said film; editing said film; and editing said tape by comparison of said tape markings with said film markings after said film has been edited.

5. A method of editing television tape comprising the steps of: providing a tape with a signal of given frequency thereon upon which a television program is recorded; photographing said television program on motion picture film; developing said film; positioning said exposed tape and developed film in tape and film editing machines; driving said tape through said tape editing machine; detecting said continuous signal from said tape; employing said signal of given frequency to drive said film through said film editing machine at a speed which is a constant fraction of the speed of said tape, whereby scenes on portions of said tape in said tape editing machine correspond to scenes on said film as viewed in said film editing machine; and simultaneously editing both said film and tape.

6. The method of claim 5, including the steps of providing said tape with a visual mark adjacent a given scene recorded thereon; and providing said film with a visual mark adjacent the scene on said film corresponding to said given scene whereby said tape and film may be initially correspondingly positioned in said editing machine by aligning said marks.

7. An apparatus for recording and editing a television program, comprising, in combination: a magnetic tape recording machine including a magnetic tape having tape markings spaced along a longitudinal edge thereof, said tape markings being both visible and reproducible from a play-back head; a television camera and recording head connected to record said program on said tape; a monitoring television receiver screen upon which said program is reproduced substantially simultaneously with the recording thereof; a motion picture camera including a pay-out reel and take-up reel for film, said camera being positioned to photograph said program from said monitoring television screen; means for reproducing said tape markings on said film to provide film markings simultaneously with the photographing of said program such that scenes recorded on said tape adjacent certain tape markings correspond to pictures of said scenes on said film adjacent corresponding film markings; and means for developing and drying said film as it is being passed to said take-up reel; whereby said film may be edited, and by subsequent comparison of said tape with said film, said tape may be edited.

8. The subject matter of claim 7, in which said means for reproducing said tape markings comprises a play-back head positioned to receive said tape after passing through said recording head and connected to said monitoring television receiver whereby said tape markings are reproduced and photographed onto said film simultaneously with said program.

9. An apparatus for editing a television program, comprising, in combination: a magnetic tape recording machine including a magnetic tape having a signal of given frequency recorded thereon; a television camera and recording head connected to record said program on said tape; a motion picture camera positioned to photograph said program as it is being recorded to provide a motion picture film of said program; a tape editing machine for receiving said tape; a film editing machine for receiving said film; tape drive means for moving said tape through said tape editing machine at a given speed; pick-up means adjacent said tape for detecting said signal of given frequency; and film drive means connected and responsive to said pick-up means for driving said film at a constant fraction of said given speed of said tape whereby scenes on portions of said tape in said tape editing machine correspond to the scenes on said film as viewed in said film editing machine.

10. The subject matter of claim 9, in which said tape is provided with a visual mark adjacent a given scene recorded thereon; and said film is provided with a visual mark adjacent the scene on said film corresponding to said given scene whereby said tape and film may be initially correspondingly positioned in said editing machines by aligning said marks.

References Cited in the file of this patent

UNITED STATES PATENTS

| | | |
|---|---|---|
| 2,219,120 | Somers | Oct. 22, 1940 |
| 2,611,803 | Rumbaugh et al. | Sept. 23, 1952 |
| 2,706,218 | Wootten | Apr. 12, 1955 |
| 2,800,831 | Keiser et al. | July 30, 1957 |

OTHER REFERENCES

Society of Motion Picture and Television Engineers, January 1956, vol. 65, pp. 7–15 inclusive.